United States Patent [19]

Quantz

[11] 3,859,627
[45] Jan. 7, 1975

[54] STARTER INTERLOCK CIRCUIT FOR A SEAT BELT UTILIZATION DETECTOR

[75] Inventor: Norman G. Quantz, Algonac, Mich.
[73] Assignee: Lectron Products, Inc., Troy, Mich.
[22] Filed: Oct. 30, 1972
[21] Appl. No.: 302,045

[52] U.S. Cl. ............ 340/52 E, 340/278, 307/10 SB
[51] Int. Cl. .......................................... B60r 21/00
[58] Field of Search ....... 340/52 E, 278; 307/10 SB; 180/82 C

[56] References Cited
UNITED STATES PATENTS

| | | | |
|---|---|---|---|
| 3,226,674 | 12/1965 | Eriksson | 340/52 E |
| 3,340,523 | 9/1967 | Whitman | 340/52 E X |
| 3,359,539 | 12/1967 | Fink | 340/52 E |
| 3,368,197 | 2/1968 | Lemon | 340/52 E |
| 3,381,268 | 4/1968 | Boblitz | 340/52 E |
| 3,462,732 | 8/1969 | Griffin | 340/52 E |
| 3,729,059 | 4/1973 | Redmond | 340/52 E |

Primary Examiner—Alvin H. Waring
Attorney, Agent, or Firm—Harness, Dickey & Pierce

[57] ABSTRACT

A starter interlock circuit for a vehicle which includes a single solenoid having a normally open set of contacts connected to a warning device and a normally closed set of contacts interposed between the starter switch and the starter motor. The solenoid has a coil which is connected to a source of potential through a transistor and a switch so that the solenoid is operated to prevent energization of the starter and to operate the warning device when both the switch and the transistor are conducting. The switch is responsive to a seat belt utilization detector and is closed on improper utilization of the one or more seat belts of the vehicle while the transistor is responsive to a timing circuit which maintains the transistor in a non-conducting condition for a predetermined interval after the ignition of the vehicle is switched off to allow the vehicle operator to operate the starter during that interval.

14 Claims, 1 Drawing Figure

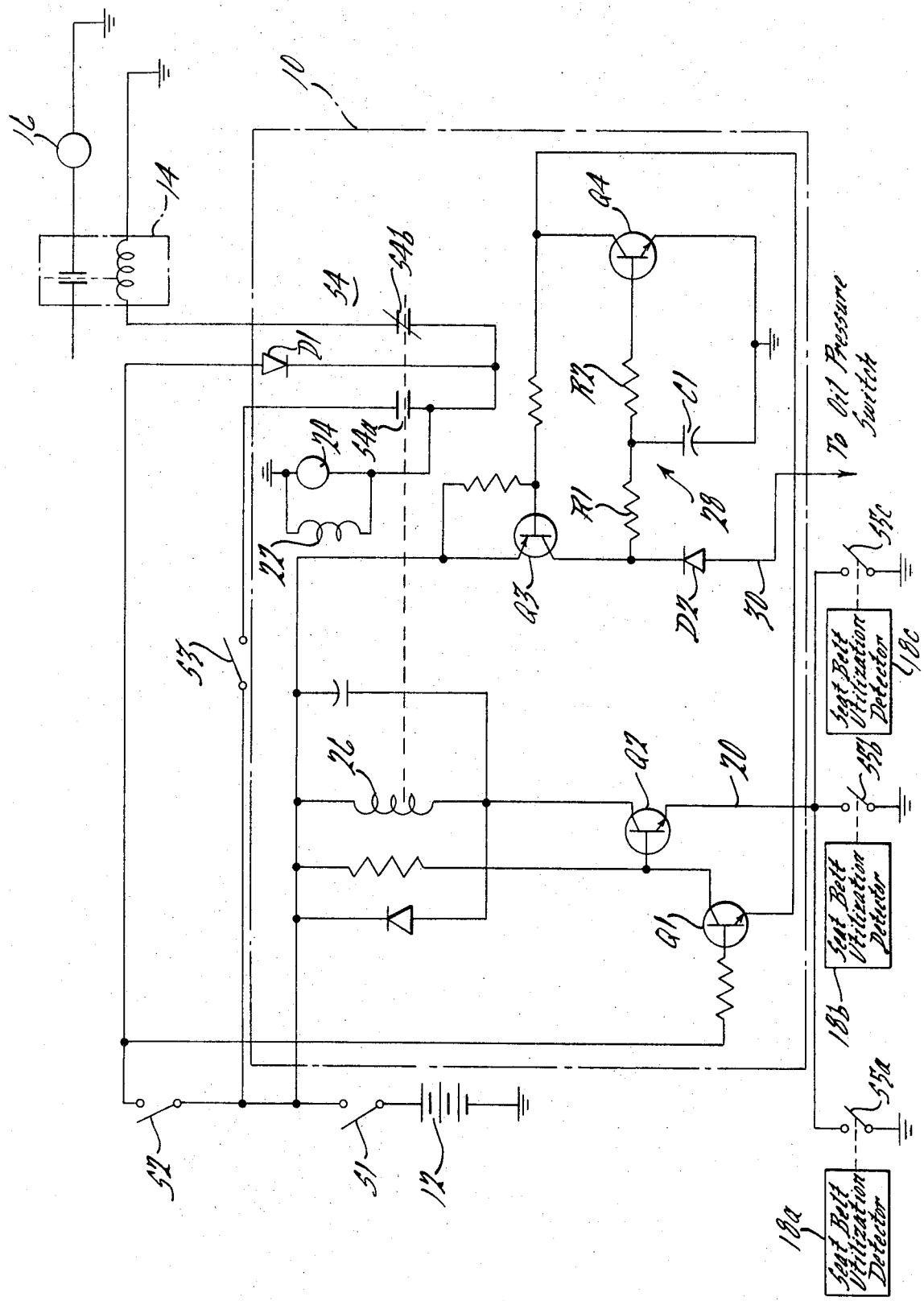

STARTER INTERLOCK CIRCUIT FOR A SEAT BELT UTILIZATION DETECTOR

BACKGROUND AND SUMMARY OF THE INVENTION

The present invention relates to a starter interlock system which utilizes a single solenoid, has a failsafe provision, permits restarting of the vehicle engine at any time so long as the ignition switch is not turned off, permits restarting of the vehicle engine during a predetermined interval after the vehicle ignition is turned off, and is adapted to be operatively associated with a plurality of seat belt utilization detectors using a common input connection for all detectors. The single solenoid of the starter interlock circuit of this invention has a pair of normally closed contacts interposed between the starter switch and the starter motor solenoid and a pair of normally opened contacts which connect the ignition switch through the transmission neutral switch to a warning device. The single solenoid includes a coil which is connected in series with at least two control switches whereby both of the switches must be closed to energize the solenoid so that, conversely, the operator is allowed to start the vehicle engine if either is opened. One of the control switches is preferably a control transistor or other solid-state switch which is rendered non-conductive by a timing circuit during a pre-established time interval after opening of the ignition switch whereby the vehicle engine can be restarted within the predetermined time interval. Another control switch is associated with the seat belt utilization detector and is openable upon a proper utilization of the associated seat belt. In installations in which a plurality of seat belts are accommodated by a plurality of seat belt utilization detectors, each seat belt utilization detector preferably has an associated control switch. The seat belt utilization detector control switches are arranged in parallel between the common input connection of the starter interlock circuit and ground whereby closing of any one of the switches may result in the completion of the current path through the solenoid coil to open the normally closed contacts and to thereby prevent the starter motor from being energized.

The timing circuit preferably includes a timing transistor which is turned on when the engine is started. For example, the timing transistor may be connected to a source of positive potential through the oil pressure warning switch which causes the timing transistor to conduct in response to an increase in oil pressure to the operating level. The timing transistor is also connected to the ignition switch through a holding transistor upon being driven into conduction to maintain the timing transistor in conduction so long as the ignition switch is closed. The timing transistor is operatively associated with the aforementioned control transistor to hold the control transistor in a non-conducting condition so long as the timing transistor is in conduction.

A timing capacitor receives a charge through the ignition switch when the timing transistor is in conduction which is sufficient to hold the timing transistor in conduction for a predetermined time interval after the ignition switch is open. Therefore, the control transistor is held in conduction for the entire time that the ignition switch is closed and for a predetermined time after the ignition switch is opened. Consequently, the vehicle operator may operate the starter to restart the vehicle engine for as long as the ignition switch is maintained in the closed position, and additionally, during the predetermined time interval after the ignition switch is opened.

In view of the above, it will be appreciated that a relatively straightforward circuit is utilized which uses only a single solenoid for operating both the starter motor and a warning device which has a failsafe provision since the failure of the system leaves the normally closed contacts interposed between the starter switch and the starter motor in the closed position. It will further be appreciated that the starter interlock circuit of this invention is readily adaptable to accommodate various numbers of seat belts since a common terminal is provided by any number of parallel-connected seat belt utilization detector switches.

BRIEF DESCRIPTION OF THE DRAWING

The drawing is a circuit diagram of the preferred embodiment of the starter interlock circuit of the present invention.

DETAILED DESCRIPTION OF THE PREFERRED EMBODIMENT

In the drawing, a starter interlock circuit 10 is illustrated in combination with a conventional vehicle battery 12, an ignition switch S1, a starter switch S2, a neutral switch S3, a starter solenoid 14, and a starter motor 16. The interlock circuit 10 includes a solenoid operated switch S4 which has a normally open set of contacts S4a, and a normally closed set of contacts S4b. The interlock circuit 10 is further associated with one or more seat belt utilization detectors 18a–18c, each of which operates an associated switch S5a–S5c, respectively, which is effective when closed to connect a common seat belt utilization input conductor 20 to ground.

Presuming that the associated seat belts of the vehicle are properly fastened about the vehicle occupants, the closing of the starter switch S2 delivers battery potential from the battery 12 through the conjunctively closed ignition switch S1, a diode D1, and the normally closed contacts S4b to the starter solenoid 14 to energize the starter motor 16. Ordinarily, if one of the seat belts of the vehicle is not properly utilized by a correlative vehicle occupant, the starter interlock circuit 10 is adapted to open the contacts S4b to prevent the energization of the starter motor 16. Moreover, the closing of the neutral switch S3 by placing the transmission in a drive position causes energization of a buzzer 22 and a warning light 24 through the then closed contacts S4a. Under certain conditions, explained in detail hereinafter, the contacts S4b are maintained in the closed position even if one or more seat belts are not utilized. As will also be appreciated in view of the detailed description herein, the buzzer 22 and the warning light 24 are activated during the interval in which the starter switch S2 is closed regardless of whether the seat belts have been properly utilized so that the condition of the buzzer 22 and the warning light 24 can be checked on each starting cycle of the vehicle.

The contacts S4a and S4b are associated with a solenoid coil 26 which is energizable to close the contacts S4a and open the contacts S4b. One terminal of the solenoid coil 26 is connected to the ignition switch S1 so as to receive battery potential upon closing of the ignition switch S1, which, as will be appreciated by those skilled in this art, is conjunctively accomplished just prior to the closing of the starter switch S2. However, before the solenoid 26 can be energized, the other terminal of the solenoid 26 must be connected to ground to complete the current path through the solenoid 26. The connection of the other terminal of the solenoid 26 to ground is provided through a control transistor Q2 and a series-connected seat belt utilization detector switch S5a–S5c. The control transistor Q2 is controlled by a transistor Q1 while each of the switches S5a–S5c is controlled by the associated seat belt utilization detector 18a–18c, respectively. A suitable seat belt utilization detector 18 is disclosed in my co-pending application entitled "Method and Apparatus for Detecting the utilization of a Vehicle Safety Belt" Ser. No. 150,088 filed June 4, 1971 and assigned to the same assignee as the assignee of the present application, the disclosure of which is incorporated herein by reference thereto. In that application, an output solenoid is disclosed which would be connected to the switch S5 for closing the switch S5 if the associated vehicle occupant had not properly utilized his seat belt.

The transistor Q1 has its base connected to the starter switch S2 so that its base is positively biased upon closing of the starter switch S2. Thereupon, the transistor Q1 will conduct, provided its emitter is connected to ground as through a circuit to be described, to clamp the base and emitter of the control transistor Q2 to render the control transistor Q2 non-conductive. Consequently, it will be appreciated that if the transistor Q1 is provided with a connection between its emitter and ground when the starter switch S2 is closed, the transistor Q1 will conduct to render the control transistor Q2 non-conductive and to in turn prevent the energization of the solenoid 26 so that the normally closed contacts S4b will remain in the closed position to permit energization of the starter motor 16 through the closed starter switch S2.

The connection of the emitter of the control transistor Q1 to ground is accomplished by a timing circuit which comprises a holding transistor Q3 and a timing transistor Q4. As can be seen in the drawing, the emitter of the transistor Q1 is connected to the timing transistor Q4 which in turn connects the emitter of the control transistor to ground if the timing transistor Q4 is conductive. The timing transistor Q4 is turned on by a suitable potential applied to its base by a timing circuit 28 which comprises resistors R1 and R2 and a timing capacitor C1. The timing circuit 28 may receive an appropriate potential for turning on the timing transistor Q4 either from the oil pressure switch on line 30 via a diode D2 or from the holding transistor Q3. With regard to the former, the oil pressure switch connects the line 30 to ground potential when the engine is inoperative, and to a positive potential while the engine is operative as indicated by an increased oil pressure. The positive potential on line 30 which is provided when the engine is operative is sufficient to turn on the timing transistor Q4. This positive potential on line 30 also serves to charge the timing capacitor C1.

The emitter of the holding transistor Q3 is connected to the ignition switch S1 and the base of the holding transistor Q3 is connected to the collector of the timing transistor Q4 so that when timing transistor Q4 conducts while the ignition switch S1 is closed, the holding transistor Q3 is driven into conduction. When conducting, the holding transistor Q3 impresses a positive potential on the base of the timing transistor Q4 through the timing circuit 28 to hold the timing transistor Q4 in conduction, even in the absence of a suitable potential from the oil pressure switch on line 30 so long as the ignition switch S1 is closed. Once the ignition switch S1 is opened, the base of the timing transistor Q4 is no longer supplied with a potential through the holding transistor Q3 to hold it in conduction. However, since the timing capacitor C1 has received a charge during the conduction of transistor Q3, the timing capacitor C1 will hold the timing transistor Q4 in conduction until such time as the charge on the timing capacitor C1 dissipates. At that time, the timing transistor Q4 will stop conducting so as to interrupt the ground path for the emitter of the transistor Q1 to turn off the transistor Q1 thereby allowing the control transistor Q2 to conduct. If, additionally, one of the seat belt utilization detector switches S5a–S5c is closed, indicating that one of the vehicle occupants is not properly utilizing his seat belt, the solenoid 26 will be energized to open the normally closed contacts S4b to prevent the restarting of the engine. At the same time, provided the transmission is in a drive position, the normally open contacts S4a are closed to connect the battery through the neutral switch S3 to the buzzer 22 and the warning light 24.

In summary of the above, presuming now that at the time that the engine has ceased to function one or more seat belts are improperly utilized, it can be seen that the timing transistor Q4 will remain conductive so long as the ignition switch remains in the "on" or "run" position thereby enabling the vehicle operator to restart the engine. If the vehicle operator had turned off the ignition switch, the timing transistor Q4 will remain conductive to permit restarting of the vehicle engine until the timing capacitor C1 discharges to a level which is no longer adequate to maintain the timing transistor Q4 in conduction. Hence, if the engine should cease operating while one or more of the seat belts are unfastened, the vehicle driver may restart the engine at any time so long as the ignition switch is not opened, and may restart the engine even after the ignition switch is opened if the restarting is accomplished within the predetermined interval of time established by the timing capacitor C1. Consequently, it can be seen that an inadvertent stalling or other stoppage of the engine while the vehicle is in use, for example, in traffic, will not prevent the operator from restarting the engine, even though one or more seat belts have not been properly utilized, at least within a certain time period after the ignition switch is turned off.

While it is preferred that the time period in which the operator of the vehicle is allowed to restart the vehicle engine is initiated when the ignition is opened, this time period may be initiated upon some other predetermined event related to or involving the cessation of the operation of the vehicle engine, for example, the actual cessation of operation of the engine as indicated by the grounding of the oil pressure switch.

While it will be apparent that the teachings herein are well calculated to teach one skilled in the art the method of making preferred embodiments of this invention, it will be appreciated that the invention is susceptible to modification, variation and change without departing from the proper scope and meaning of the subjoined claims.

I claim:

1. For a vehicle having an engine with an ignition system, an ignition switch which is closable for energizing the ignition system of said engine and openable for de-energizing the ignition system of said engine, a starter switch, a starter motor, and a seat belt utilization detector including switch means which is conductive on improper utilization of a seat belt for the vehicle and nonconductive on proper utilization of the seat belt for the vehicle a starter interlock circuit comprising:

solenoid switch means having a coil and a pair of contacts which are closed so as to be conductive therebetween when said coil is not energized, said coil being adapted for connection in series with said seat belt utilization detector switch means, said contacts being adapted for connection intermediate and ignition switch and said starter motor so as to provide a current path for energization of said starter motor through said contacts when said contacts are closed; and timing means including switch means connected in series with said coil and being adapted to connection in series with said seat belt utilization detector switch means, said timing means being adapted to hold said timing means switch means nonconductive for a predetermined time interval after the opening of said ignition switch and to render said timing means switch means conductive after said predetermined time interval;

said coil, said seat belt utilization detector switch means, and said timing means switch means forming a series circuit which is adapted for connection to a source of potential whereby the nonconductive condition of one of said seat belt utilization detector switch means indicative of proper utilization of said seat belt of said vehicle and said timing circuit switch means indicative of a lapse of a time less than said predetermined time interval prevents the energization of said coil whereby said solenoid contacts are closed so that said starter switch is effective to energize said starter motor.

2. A starter interlock circuit according to claim 1 wherein said vehicle has a plurality of seat belt utilization detectors with each seat belt utilization detector including switch means which is conductive on improper utilization of the said seat belt for the vehicle and nonconductive on proper utilization of said seat belt for the vehicle and wherein said starter interlock circuit includes single conductor means for connecting each of said seat belt utilization detector switch means in series with said solenoid switch means and said timing means switch means.

3. A starter interlock circuit according to claim 1 wherein said timing means switch means is a solid state switch having a pair of terminals connected in series with said coil and said seat belt utilization detector switch means and having a control terminal which is responsive to a timing control signal representative of said predetermined time interval for rendering said solid state switch nonconductive between said pair of terminals during said predetermined time interval.

4. A starter interlock circuit according to claim 3 further including a capacitor which is charged when said vehicle engine is operating and which is dischargeable at a predetermined rate subsequent to the opening of said ignition switch, said capacitor being operatively associated with said control terminal of said solid state device for maintaining said solid state device nonconductive between said pair of terminals during a predetermined discharge of said capacitor so as to establish said predetermined time interval.

5. A starter interlock circuit according to claim 1 further including holding means for maintaining said timing means switch means non-conductive after cessation of operation of said engine while said ignition switch is closed.

6. A starter interlock circuit according to claim 5 wherein said vehicle includes an oil pressure switch which is operable in response to a predetermined oil pressure resulting from operation of said engine, and wherein said holding means is responsive to said oil pressure switch so that said holding means is effective, upon operation of said engine as indicated by said oil pressure switch, to hold said timing means switch means non-conductive until said ignition switch is opened.

7. A starter interlock circuit according to claim 6 wherein said timing means switch means is a solid state switch having a pair of terminals connected in series with said coil and said seat belt utilization detector switch means and having a control terminal which is responsive to a timing control signal representative of said predetermined time interval for rendering said solid state switch non-conductive between said pair of terminals during said predetermined time interval.

8. A starter interlock circuit according to claim 7 wherein said holding means is effective to provide a signal to said control terminal of said solid state switch means prior to opening of said ignition switch for rendering said solid state switch non-conductive during the duration of said holding means signal.

9. A starter interlock circuit according to claim 8 wherein said holding means signal is provided at least in part through said ignition switch when said ignition switch is closed.

10. For a vehicle having an engine with an ignition system, an ignition switch which is closable for energizing the ignition system of said engine and openable for de-energizing the ignition system of said engine, a seat belt utilization detector including switch means which is closed on improper utilization of a seat belt for the vehicle and is open on proper utilization of the seat belt for the vehicle, an interlock circuit for preventing the operation of said vehicle comprising:

interlock switch means having a control conductor and a pair of terminals, said interlock switch means being conductive between said interlock switch means terminals when said control conductor is energized, said control conductor being adapted for connection to said seat belt utilization detector switch means, said pair of terminals being adapted for providing a current path for energization of said seat belt utilization responsive means;

timing means having switch means connected to said control conductor and being adapted for connection in series with said seat belt utilization detector switch means, said timing means being adapted to hold said timing means switch means open for a determinable time interval after the opening of said ignition switch; and said control conductor, said timing means switch means, and said seat belt utilization detector means forming a circuit which is adapted for connection to a source of potential for energizing said control conductor when said seat belt utilization detector switch means and said timing means switch means are closed whereby the open condition of one of said seat belt utilization detector switch means indicative of improper utilization of said seat belts of said vehicle and said timing circuit switch means indicative of a lapse of time less than said predetermined time interval prevents energization of said control conductor to prevent the operation of said vehicle.

11. An interlock circuit according to claim 10 wherein said vehicle has a plurality of seat belt utilization detectors with each seat belt utilization detector including switch means which is conductive on improper utilization of an associated seat belt for the vehicle and non-conductive on proper utilization of the associated seat belt for the vehicle, and wherein said interlock circuit includes single conductor means for connecting each of said seat belt utilization detector switch means in series with said timing means switch means.

12. An interlock circuit according to claim 10 further including holding means for maintaining said timing means switch means nonconductive after cessation of operation of said engine while said ignition switch is closed.

13. For a vehicle having an engine with an ignition system, an ignition switch which is closable for energizing the ignition of said engine and openable for de-energizing the ignition of said engine, and a seat belt utilization detector for indicating the improper utilization of a seat belt for the vehicle, and interlock for preventing operation of the vehicle comprising:

interlock means responsive to said seat belt utilization detector for preventing the operation of said vehicle when said seat belt utilization detector indicates improper utilization of a seat belt of said vehicle;

holding means for allowing operation of said vehicle after the cessation of operation of said engine while said ignition switch remains closed; and timing means responsive to the opening of said ignition switch for initiating a predetermined timing period and for allowing the restarting of said engine during said predetermined timing period after said ignition switch is opened.

14. For a vehicle having an engine with an ignition system, an ignition switch which is closable for energizing the ignition of said engine and openable for de-energizing the ignition of said engine, and a seat belt utilization detector for indicating the improper utilization of a seat belt for the vehicle, an interlock for preventing operation of the vehicle comprising:

interlock means responsive to said seat belt utilization detector for preventing the operation of said vehicle when said seat belt utilization detector indicates improper utilization of a seat belt of said vehicle; and timing means responsive to the opening of said ignition switch for initiating a predetermined timing period and for allowing the restarting of said engine during said predetermined timing period after said ignition switch is opened.

* * * * *

UNITED STATES PATENT OFFICE
CERTIFICATE OF CORRECTION

Patent No. 3,859,627    Dated  January 7, 1975

Inventor(s)  Norman G. Quantz

It is certified that error appears in the above-identified patent and that said Letters Patent are hereby corrected as shown below:

Column 5, line 16, "and", first occurrence, should be --said--; line 21, "to" should be --for--.

Signed and sealed this 4th day of March 1975.

(SEAL)
Attest:

RUTH C. MASON
 Attesting Officer

C. MARSHALL DANN
Commissioner of Patents
  and Trademarks